(12) United States Patent
Choi et al.

(10) Patent No.: US 11,119,297 B2
(45) Date of Patent: Sep. 14, 2021

(54) SMALL WIDE-ANGLE LENS SYSTEM HAVING SIX LENSES OF −+−++− OR ++−++− REFRACTIVE POWERS

(71) Applicant: SEKONIX CO., LTD., Gyeonggi-do (KR)

(72) Inventors: Soon Cheol Choi, Gyeonggi-do (KR); Ki Youn Noh, Gyeonggi-do (KR); Seung Nam Nam, Gyeonggi-do (KR); Sung Nyun Kim, Incheon (KR)

(73) Assignee: SEKONIX CO., LTD.

( * ) Notice: Subject to any disclaimer, the term of this patent is extended or adjusted under 35 U.S.C. 154(b) by 182 days.

(21) Appl. No.: 16/576,183

(22) Filed: Sep. 19, 2019

(65) Prior Publication Data
US 2020/0326514 A1    Oct. 15, 2020

(30) Foreign Application Priority Data

Apr. 12, 2019    (KR) ........................ 10-2019-0043295

(51) Int. Cl.
*G02B 13/00* (2006.01)
*G02B 13/04* (2006.01)
*G02B 9/62* (2006.01)

(52) U.S. Cl.
CPC ............... *G02B 13/04* (2013.01); *G02B 9/62* (2013.01); *G02B 13/0045* (2013.01)

(58) Field of Classification Search
CPC .............................. G02B 9/62; G02B 13/0045
See application file for complete search history.

(56) References Cited

U.S. PATENT DOCUMENTS

2017/0123186 A1\* 5/2017 Shin ................... G02B 27/0025

\* cited by examiner

*Primary Examiner* — Wen Huang
(74) *Attorney, Agent, or Firm* — Mendelsohn Dunleavy, P.C.

(57) ABSTRACT

A small wide-angle lens system having six lenses is proposed. In the lens systems, a first lens is biconvex toward a focal object, with center thickness (Tc) and thickness (Te) of the outermost effective diameter satisfying $1.1<Tc/Te<1.5$, and a refractive power (P1) satisfying $-0.06<P1<0.06$. A second lens has a positive refractive power, a front surface convex toward the focal object, and a radius of curvature (R4) of the rear surface satisfying $10<|R4|$. A third lens has a negative refractive power, a rear surface concave toward an image and a radius of curvature (R5) of the front surface satisfying $10<|R5|$. A distance interval (T12) in an effective diameter of the first and second lenses satisfies $T12<0.2$ mm, and a distance interval (T23) within an effective diameter of the second and third lenses satisfies $T23<0.1$ mm.

18 Claims, 11 Drawing Sheets

PRIOR ART

SMALL WIDE-ANGLE LENS SYSTEM HAVING SIX LENSES OF −+−++− OR ++−++− REFRACTIVE POWERS

CROSS REFERENCE TO RELATED APPLICATION

The present application claims priority to Korean Patent Application No. 10-2019-0043295, filed Apr. 12, 2019, the entire contents of which is incorporated herein for all purposes by this reference.

BACKGROUND OF THE INVENTION

Field of the Invention

The present invention relates generally to a wide-angle lens system. More particularly, the present invention relates to a small wide-angle lens system, which includes a total of six lenses, and by properly designing the refractive power, shape, and the like of the lens, it is possible to realize lightness and smallness of the lens system and efficient correction of distortion, thereby providing an image with high-resolution and having a wide-angle view.

Description of the Related Art

Recently, portable terminals are equipped with a camera to enable a video call and picture taking. Furthermore, the more functions provided by the camera in the portable terminal, the more an increase in demand for the high-resolution and the wide-angle of the camera for the portable terminal. Also, the miniaturization for easy portability of such devices has become a trend.

In order to realize such functions having high resolution, high performance, and miniaturization, the camera lens is made of plastic material lighter than glass these days, and the lens system is composed of six or more lenses for high resolution.

In particular, due to the limitations of smartphone thickness, the shorter the total track length of the lens system, the more advantageous for small lenses mounted on a smartphone.

As illustrated in FIG. 1, the U.S. Pat. No. 8,379,323 lens system comprises a total of six lenses. The first lens has a positive refractive power, and the sixth lens has a negative refractive power. Associated with a length of the lens, an ImagH (image height) and TTL (distance from a front surface to an image surface of the lens) satisfy TTL/ImagH=1.78, thus the lens system with a lengthy lens having a limitation to applying to a thin smartphone.

SUMMARY OF THE INVENTION

Accordingly, the present invention has been made keeping in mind the above problems occurring in the related art, and the present invention is intended to propose a small wide-angle lens system in which a total of six lenses designed having appropriate refractive power, shape, and the like of the lens so as to realize lightness and smallness and to enable efficient correction of distortion, thereby providing a high-resolution image and minimizing the length of the entire lens system.

In order to achieve the above objective, according to one aspect of the present invention, there is provided a small wide-angle lens system having a plurality of lenses arranged along an optical axis from a focal object side in order of a first lens, a second lens, a third lens, a fourth lens, a fifth lens, and a sixth lens. The wide-angle lens system includes: the first lens L1, wherein both surfaces of the first lens L1 are convex toward the focal object side, a center thickness Tc of the first lens L1 and a thickness Te of an outermost effective diameter of the first lens L1 satisfies $1.1<Tc/Te<1.5$, and a refractive power P1 of the first lens L1 satisfies $-0.06<P1<0.06$; the second lens L2, wherein the second lens L2 has a positive refractive power, the front surface of the second lens L2 is convex toward the focal object side, and a radius of curvature R4 at a rear of the second lens L2 satisfies $10<|R4|$; the third lens L3, wherein the third lens L3 has a negative refractive power, a rear surface of the third lens L3 is concave toward an image side, and a radius of curvature R5 of the front surface of the third lens L3 satisfies $10<|R5|$; the fourth lens L4, wherein both surfaces of the fourth lens L4 are concave toward the focal object; the fifth lens L5, wherein the fifth lens L5 has a positive refractive power; and the sixth lens L6, wherein the sixth lens L6 has a negative refractive power, wherein a distance interval T12 within an effective diameter of the first lens L1 and the second lens L2 satisfies $T12<0.2$ mm, and a distance interval T23 within an effective diameter of the second lens L2 and the third lens L3 satisfies $T23<0.1$ mm.

In addition, a composite focal length f123 of the first lens, the second lens, and the third lens, and a composite focal length f56 of the fifth lens and the sixth lens may satisfy $0.4<|f123/f56|<0.8$.

In addition, an image height ImagH, and a distance TTL from the front of the lens system to an image surface may satisfy $TTL/ImagH<1.45$.

In addition, the fourth lens may have a positive refractive power, and the refractive power P4 may satisfy $0<P4<0.1$.

The Abbe number V1 of the first lens, the Abbe number V2 of the second lens, the Abbe number V3 of the third lens, the Abbe number V4 of the fourth lens, the Abbe number V5 of the fifth lens, and the Abbe number V6 of the sixth lens may respectively satisfy $50<V1<60$, $50<V2<60$, $15<V3<30$, $15<V4<30$, $50<V5<60$, and $50<V6<60$.

In addition, all of the first to the sixth lenses may be formed of a plastic material and all the surfaces may be aspherical, and both surfaces of the fifth lens and the sixth lens may be convex toward the image at the peripheral portion.

Also, the angle of view of the small wide-angle lens system may be greater than 78 degrees.

In another aspect of the present invention, there is provided a small wide-angle lens system mounted on a smartphone, the small wide-angle lens system having a plurality of lenses arranged along an optical axis from a focal object side to a first lens, a second lens, a third lens, a fourth lens, a fifth lens, and a sixth lens. The small wide-angle lens system further includes: the first lens L1, wherein both surfaces of the first lens are convex toward the focal object side, a center thickness Tc of the first lens and a thickness Te of an outermost effective diameter of the first lens satisfy $1.1<Tc/Te<1.5$, and a refractive power P1 of the first lens satisfies $-0.06<P1<0.06$; the second lens L2, wherein the second lens L2 has a positive refractive power, a front surface of the second lens is convex toward the focal object side, and the radius of curvature R4 at the rear surface satisfies $10<|R4|$; the third lens L3, wherein the third lens L3 has the negative refractive power, the rear surface of the third lens L3 is concave toward the image side, and a radius of curvature R5 of the front surface satisfies $10<|R5|$; the fourth lens L4, wherein both surfaces are concave toward a focal object and the fourth lens L4 has a positive refractive power, and a refractive power P4 satisfies 0<P4<0.1; the fifth lens L5, wherein the fifth lens L5 has a positive refractive power; and the sixth lens L6, wherein the sixth lens L6 has a negative refractive power; wherein a composite focal length f123 of the first lens, the second lens and the third lens, and a composite focal length f56 of the fifth lens and the sixth lens satisfy 0.4<|f123/f56|<0.8.

In addition, a distance interval T12 of the lens within an effective diameter of the first lens and the second lens may satisfy T12<0.2 mm, and a distance interval T23 of the lens within an effective diameter of the second lens and the third lens satisfies T23<0.1 mm.

In addition, an image height ImagH and a distance TTL from the front surface to the image surface of lens system may satisfy TTL/ImagH<1.45.

In addition, an Abbe number V1 of the first lens, an Abbe number V2 of the second lens, an Abbe number V3 of the third lens, an Abbe number V4 of the fourth lens, an Abbe number V5 of the fifth lens, and an Abbe number V6 of the sixth lens respectively may satisfy 50<V1<60, 50<V2<60, 15<V3<30, 15<V4<30, 50<V5<60, and 50<V6<60.

In addition, all of the first to the sixth lenses may be formed of a plastic material and all surfaces are aspherical.

In addition, both surfaces of the fifth lens and the sixth lens may be convex at peripheral portions to the image side.

In addition, an angle of view of the small wide-angle lens system may be greater than 78 degrees.

The present invention relates to a small wide-angle lens system having a plurality of lenses arranged along an optical axis from a focal object side to a first lens, a second lens, a third lens, a fourth lens, a fifth lens, and a sixth lens. The lens system realizes lightness and smallness and enables efficient correction of distortion, thereby providing a high-resolution image and satisfying a horizontal angle of view with 78 degrees or more.

In particular, a ratio of a height of the image surface to a distance from the front surface of the lens system to the image surface is smaller than 1.45 to provide a lens system with a short length, thus easily allowing the lens system to be applied to a thin or small camera module, particularly a smartphone.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The present invention relates to a lens system having a plurality of lenses arranged along an optical axis from a focal object side to a first lens, a second lens, a third lens, a fourth lens, a fifth lens, and a sixth lens.

Furthermore, by properly designing the refractive poser, shape, and others, the lens system realizes lightness and smallness and enables correction of distortion, thereby providing an image with high-resolution and satisfying a horizontal angle of view with 78 degrees or more.

In particular, since a ratio of the height of an image surface to the distance from a front surface of the lens system to an image surface is smaller than 1.45, a short lens system provides to applying to a thin and compact camera module such as a smartphone.

Figure 1:
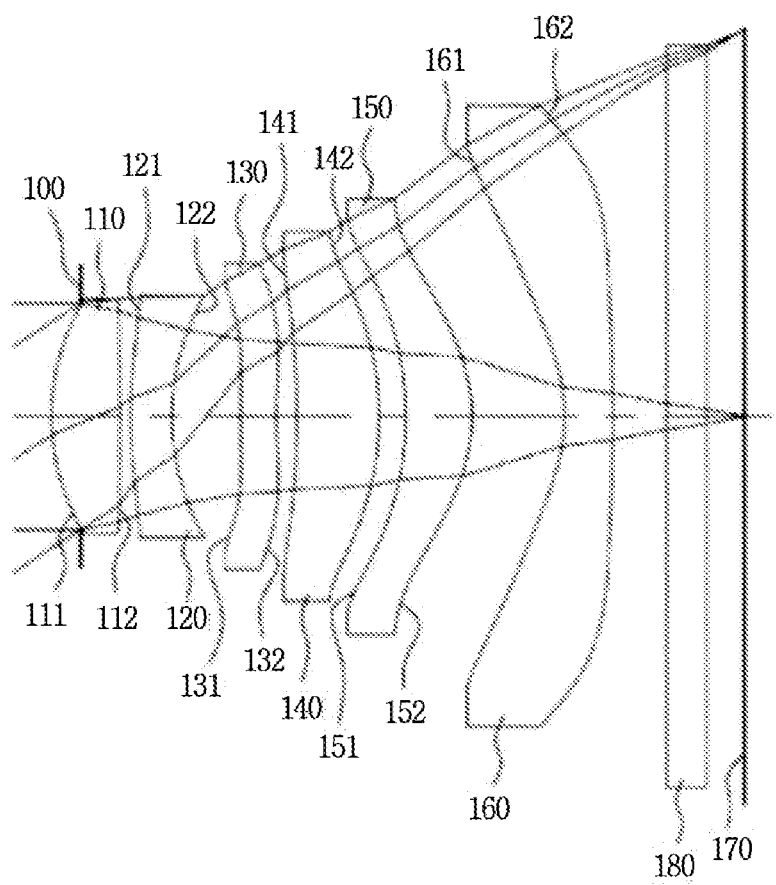
FIG. 1 is a schematic diagram of a small wide-angle lens system in the related art.
Figure 2:
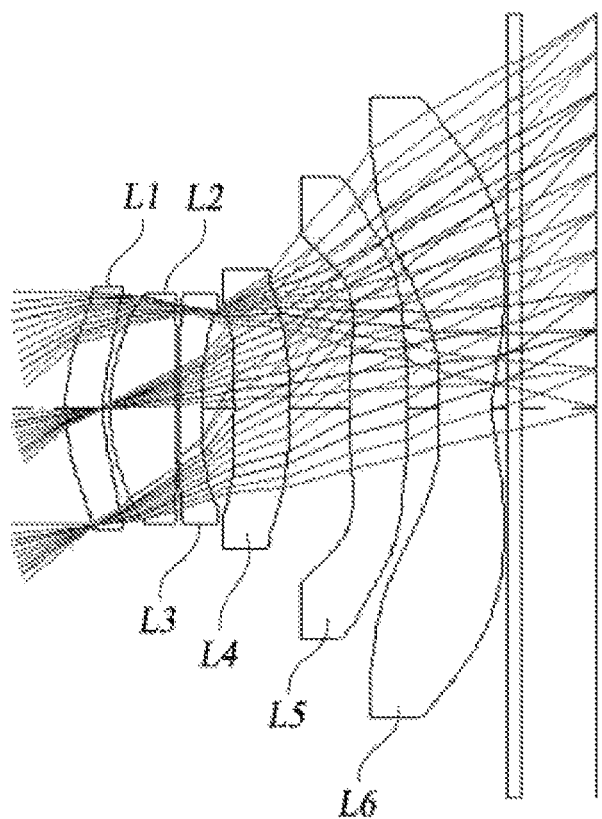
FIG. 2 is a diagram showing a first exemplary embodiment of the small wide-angle lens system according to the present invention.
Figure 3:
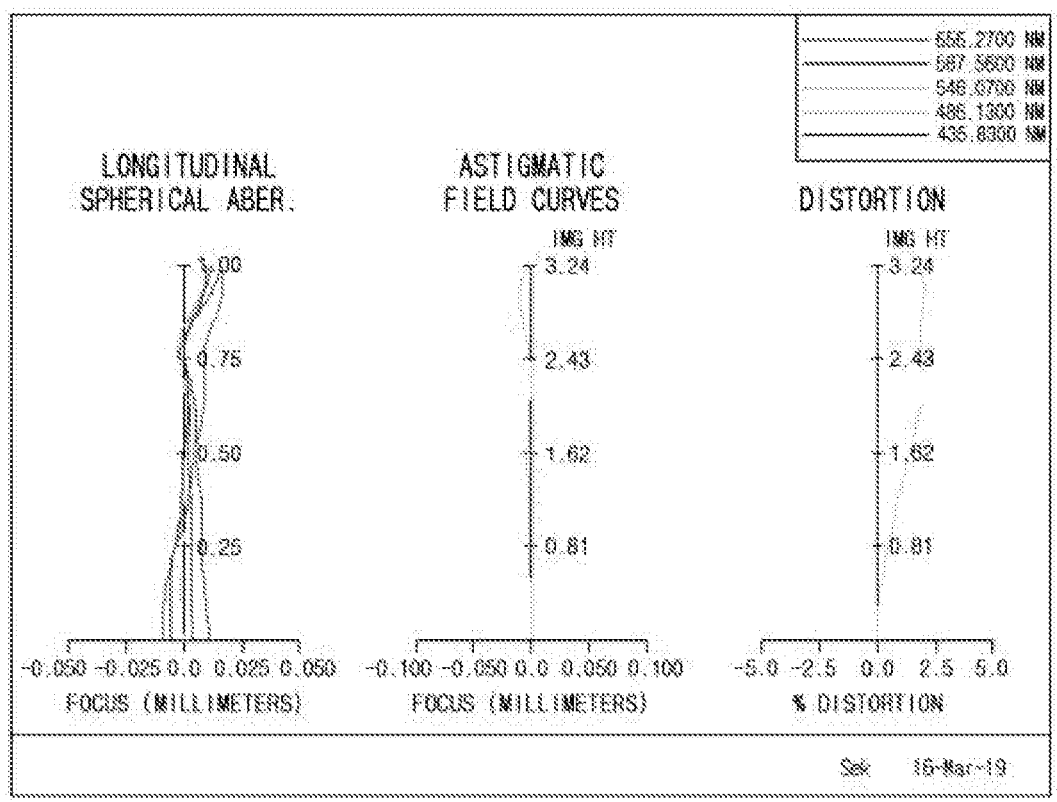
FIG. 3 is an aberrational diagram according to a first exemplary embodiment of the present invention.
Figure 4:
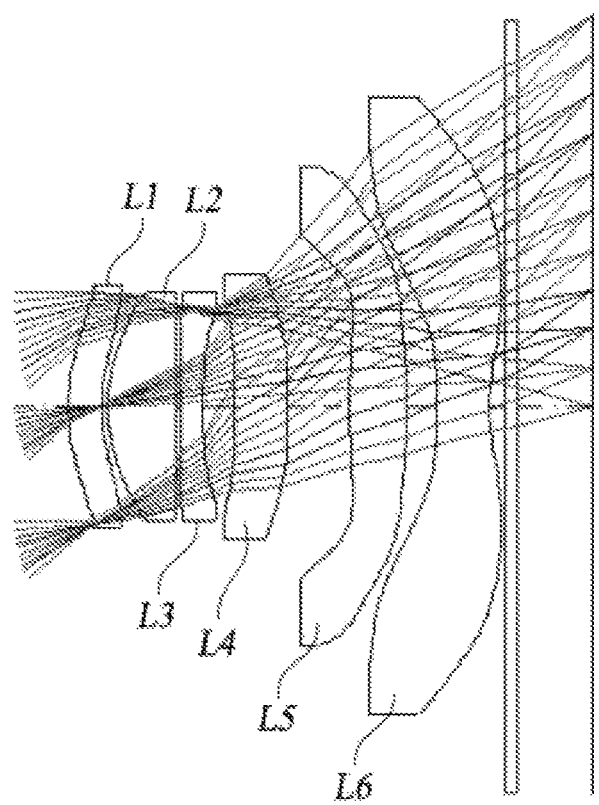
FIG. 4 is a diagram showing a second exemplary embodiment of the small wide-angle lens system according to the present invention.

Hereinafter, with reference to the accompanying drawings, the present invention will be described in detail. FIG. 2 shows a diagram illustrating a first exemplary embodiment of the small wide-angle lens system according to the present invention; FIG. 3 shows an aberrational diagram according to a first exemplary embodiment of the present invention; and FIG. 4 is a diagram showing a second exemplary embodiment of the small wide-angle lens system according to the present invention.

Figure 5:
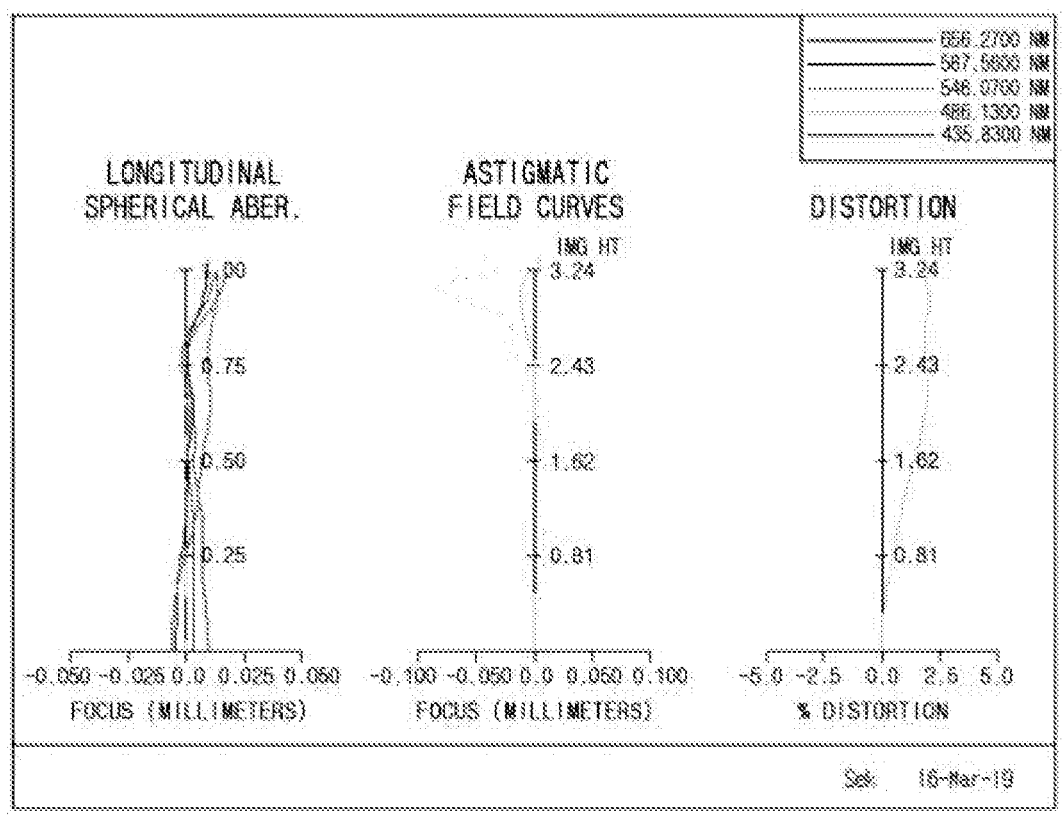
FIG. 5 is an aberrational diagram according to a second exemplary embodiment of the present invention.
Figure 6:
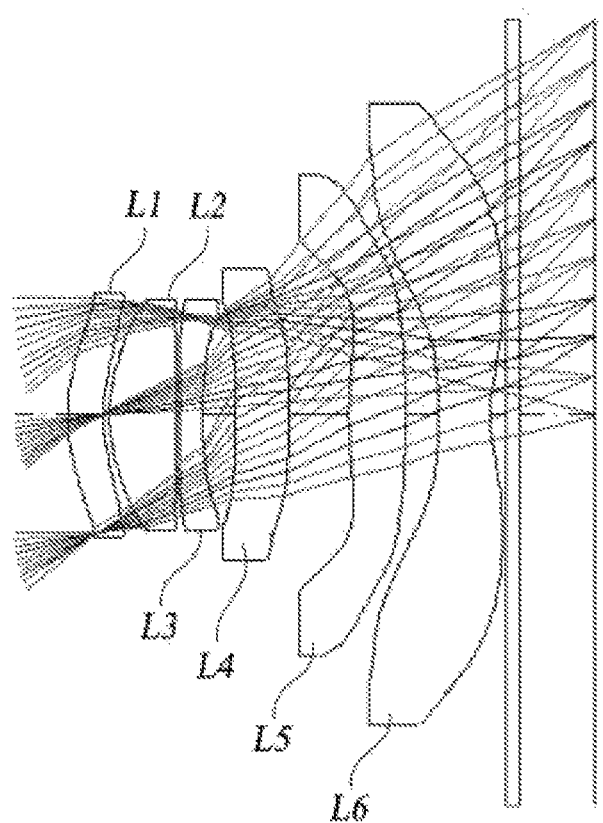
FIG. 6 is a diagram showing a third exemplary embodiment of the small wide-angle lens system according to the present invention.
Figure 7:
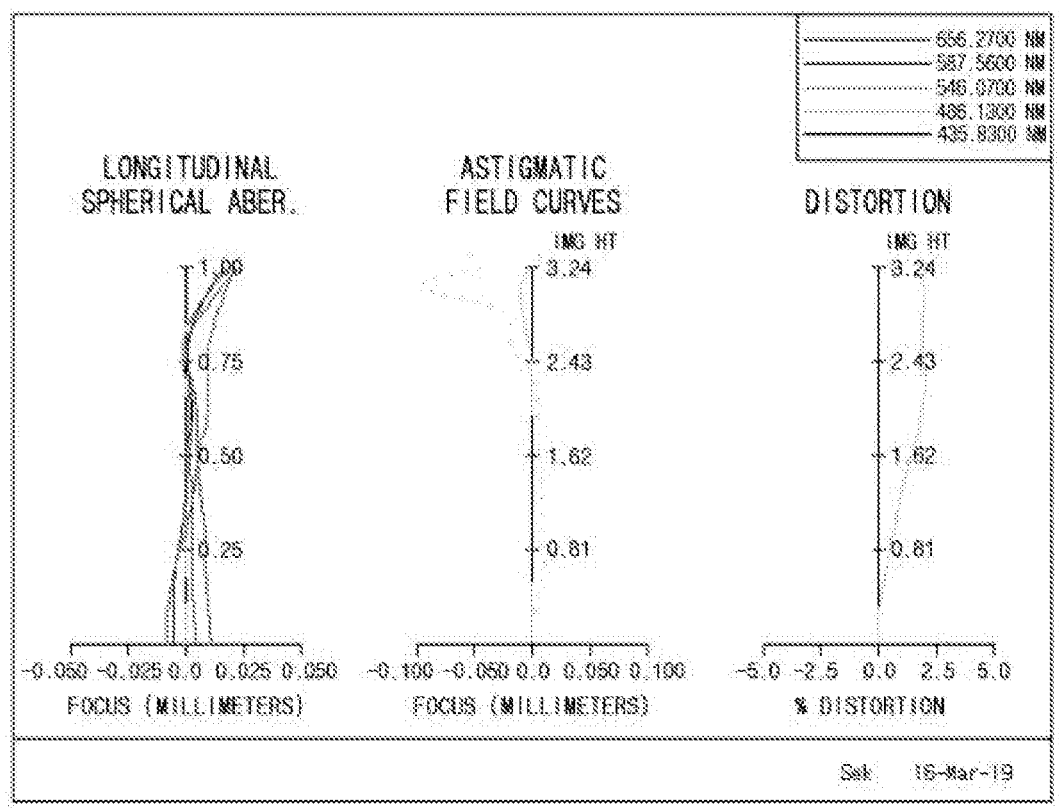
FIG. 7 is an aberrational diagram according to a third exemplary embodiment of the present invention.

FIG. 5 shows an aberrational diagram according to a second exemplary embodiment of the present invention, FIG. 6 is a diagram showing a third exemplary embodiment of the small wide-angle lens system according to the present invention, and FIG. 7 is an aberrational diagram according to a third exemplary embodiment of the present invention.

Figure 8:
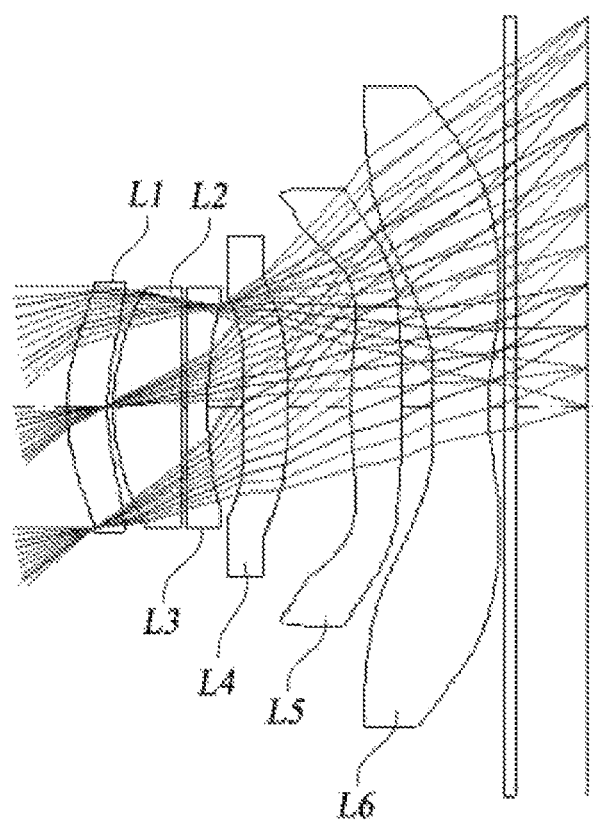
FIG. 8 is a diagram showing a fourth exemplary embodiment of the small wide-angle lens system according to the present invention.
Figure 9:
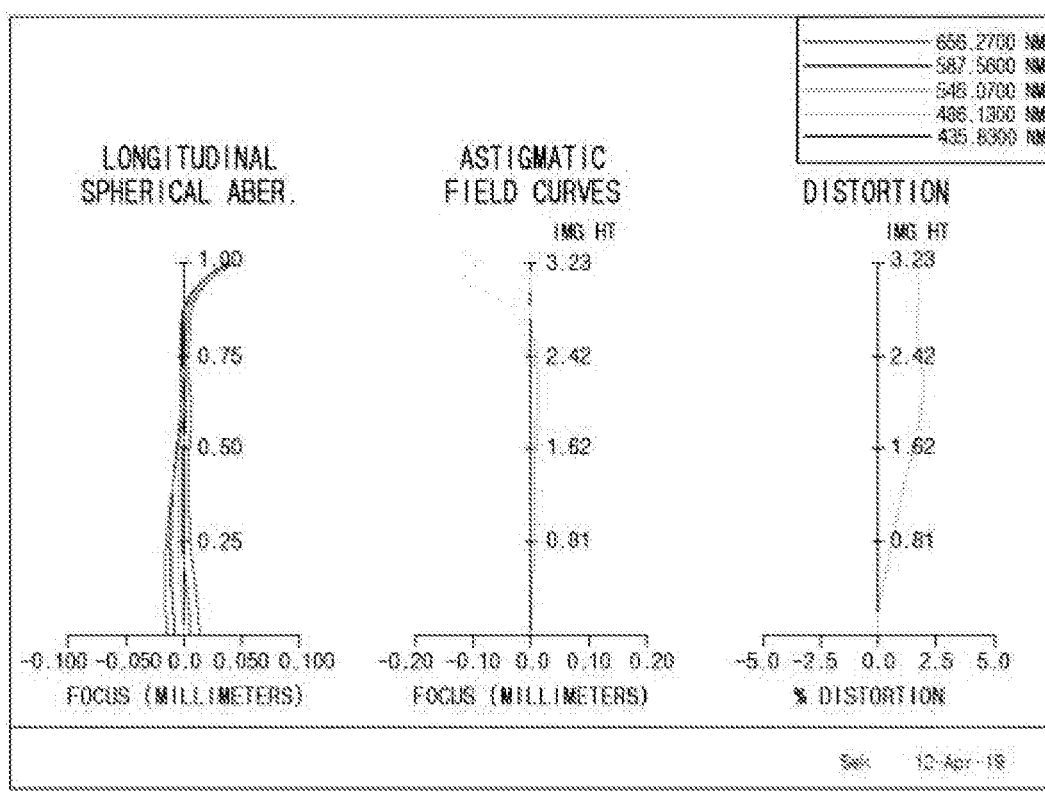
FIG. 9 is an aberrational diagram according to a fourth exemplary embodiment of the present invention.
Figure 10:
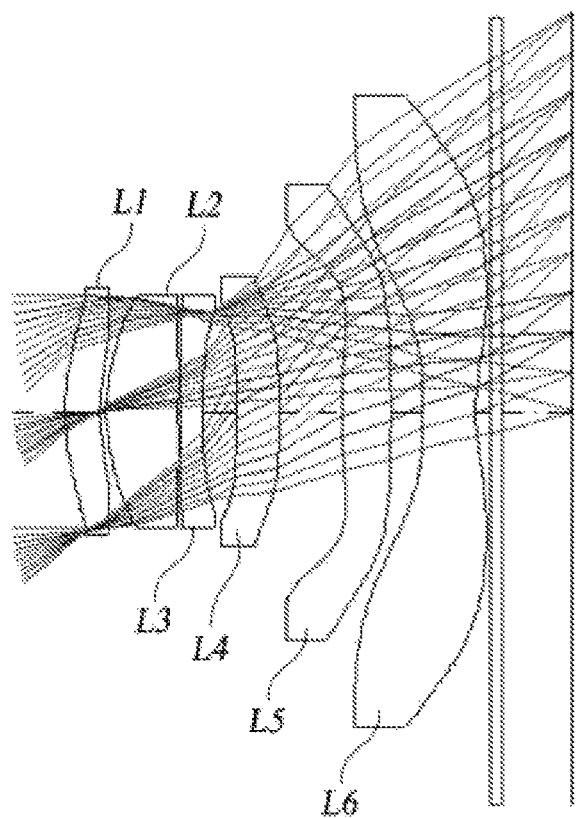
FIG. 10 is a diagram showing a fifth exemplary embodiment of the small wide-angle lens system according to the present invention.
Figure 11:
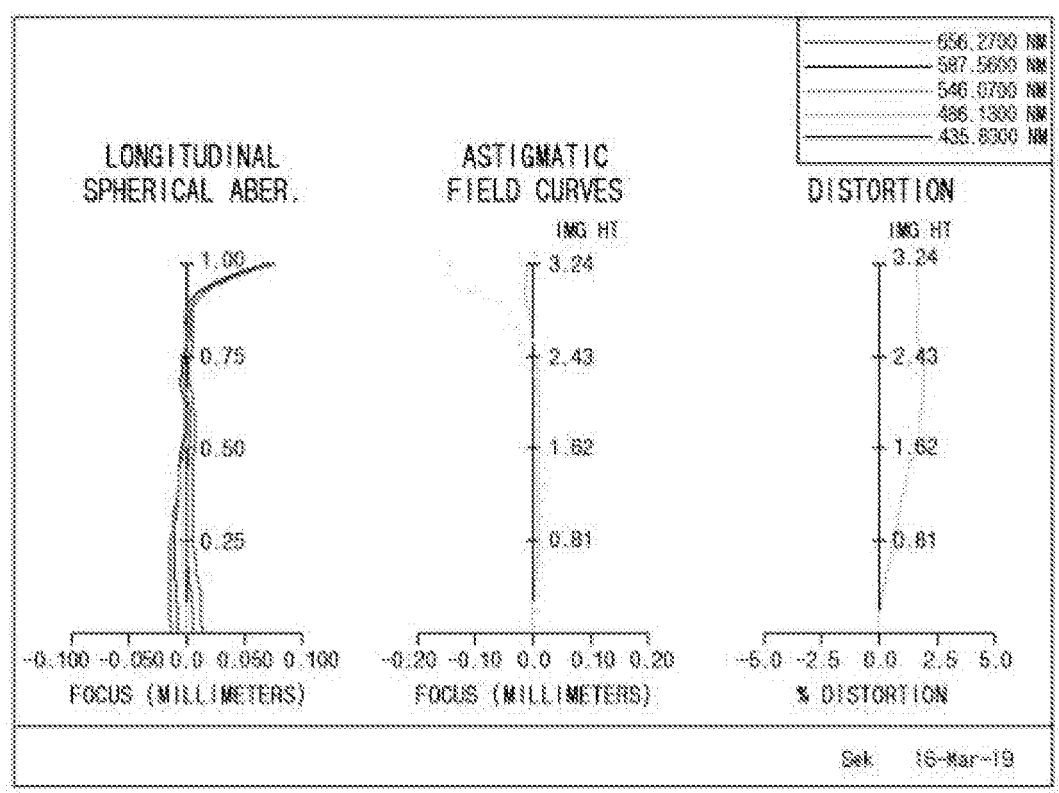
FIG. 11 is an aberrational diagram according to a fifth exemplary embodiment of the present invention.

FIG. 8 is a diagram showing a fourth exemplary embodiment of the telephoto lens system according to a fourth exemplary embodiment of the present invention. FIG. 9 is an aberrational diagram according to the present invention. FIG. 10 is a diagram showing a fifth exemplary embodiment of the telephoto lens system according to the present invention. FIG. 11 is an aberrational diagram according to a fifth exemplary embodiment of the present invention.

As shown, the present invention relates to a small wide-angle lens system, wherein the first lens L1, the second lens L2, the third lens L3, the fourth lens L4, the fifth lens L5, and the sixth lens L6 are arranged from the focal object side along the optical axis, both surfaces of the first lens L1 are convex toward the focal object side, the center thickness Tc of the first lens L1 and the thickness Te of the outermost effective diameter of the first lens L1 satisfies 1.1<Tc/Te<1.5, the refractive power P1 of the first lens L1 satisfies −0.06<P1<0.06, and the second lens L2 has a positive refractive power; the front surface of the second lens L2 is convex toward the focal object side, the radius of curvature R4 at the rear of the second lens L2 satisfies 10<|R4|, and the third lens L3 has a negative refractive power; and the rear surface of the third lens L3 is concave toward the image side, the radius of curvature R5 of the front surface of the third lens L3 satisfies 10<|R5|, both surfaces of the fourth lens L4 are concave toward a focal object, the fifth lens L5 has a positive refractive power, the sixth lens L6 has a negative refractive power, the distance interval T12 within the effective diameter of the first lens L1 and the second lens L2 satisfies T12<0.2 mm, and the spacing gap T23 within the effective diameter of the second lens L2 and the third lens L3 satisfies T23<0.1 mm.

These features allow each lens forming the lens system to have a positive and negative refractive power evenly distributed, enabling high performance suitable for a high pixel lens system.

In particular, both surfaces of the first lens L1 are convex toward the focal object side, and the center thickness Tc of the first lens L1 and the thickness Te of the outermost effective diameter of the first lens L1 satisfies 1.1<Tc/Te<1.5, and the refractive power P1 of the first lens L1 satisfies −0.06<P1<0.06.

That is, in the optical axis region, the lens system has very weak refractive power and the peripheral portion has positive refractive power, and both sides are convex toward the focal object side, so that the space in the barrel is secured to be suitable for the small lens system.

In addition, the second lens L2 has a positive refractive power, and its front surface is convex toward the focal object side, and the radius of curvature R4 of its rear surface satisfies 10<|R4|. That is intended to implement a small lens system by having a radius of curvature R4 larger than 10 mm and making the second lens L2 very close to the third lens L3.

In addition, the third lens L3 has a negative refractive power, and its rear surface is concave toward the image side, and the radius of curvature R5 of its front surface satisfies 10<|R5|. That is intended to implement a small lens system by having a radius of curvature R5 larger than 10 mm and making the second lens L2 very close to the third lens L3.

As a result, the distance interval T12 between the lenses within the effective diameter of the first lens L1 and the second lens L2 satisfies T12<0.2 mm, and the distance interval T23 between the lenses within the effective diameter of the second lens L2 and the third lens L3 satisfies T23<0.1 mm. Thus, these lenses may be effectively applied to a very small lens system having a very short length.

In addition, the composite focal length f123 of the first lens L1, the second lens L2, and the third lens L3, and the composite focus length f56 of the fifth lens L5 and the sixth lens L6 satisfies 0.4<f123/f56<0.8. This relationship sets value of a composite focal length of the fifth lens L5 and the sixth lens L6 with respect to the composite focal length of the first lens L1, the second lens L2, and the third lens L3. Thus, the lens system may have a strong refractive power, leading to the miniaturization and the realization of wide angle.

In addition, both surfaces of the fourth lens L4 are concave toward the focal object side and have positive refractive power and the refractive power P4 satisfies 0<P4<0.1. Therefore, the aberration of the lens system is corrected to lead to miniaturization and realization of wide-angle.

In addition, the fifth lens L5 has a positive refractive power, the sixth lens L6 has a negative refractive power, and both surfaces of the fifth lens L5 and the sixth lens L6 are convex toward the image side at the periphery, thus easily correcting distortion and various aberrations. Therefore, it is suitable for a small wide-angle lens system to apply.

In addition, in order to correct chromatic aberration, the Abbe number V1 of the first lens L1, the Abbe number V2 of the second lens L2, the Abbe number V3 of the third lens L3, the Abbe number V4 of L4 of the fourth lens, the Abbe number V5 of the fifth lens L5, and the Abbe number V6 of the sixth lens L6 respectively satisfy 50<V1<60, 50<V2<60, 15<V3<30, 15<V4<30, 50<V5<60, and 50<V6<60. All surfaces of the first lens L1 to sixth lens L6 are aspherical. These Abbe numbers of each lens are evenly allocated to distribute power and to correct chromatic aberration.

In the lens system according to the present invention, the image surface height ImagH and the distance TTL from the front surface of the lens system to the image surface satisfy TTL/ImagH<1.45. Thus, short length small lens system is provided to be suitable to apply for small electronic devices such as a smartphone.

Besides, the angle of view of the lens system according to the present invention satisfies 78 degrees or more (the horizontal angle of view provides a wide-angle image between 78 and 130 degrees).

As described above, the present invention relates to a lens system composed of a total of six lenses, wherein the first lens L1, the second lens L2, the third lens L3, the fourth lens L4, the fifth lens L5, and the sixth lens L6 are arranged along the optical axis.

In addition, the present invention relates to a small wide-angle lens system in which the refractive power, shape, and the like of the lens are properly designed to correct the distortion and realize smallness and lightness, satisfying the horizontal angle of view of 78 degrees or more.

In particular, the height of the image surface and the distance from the front surface of the lens system to the image surface is smaller than 1.45 to provide a short lens system, so that it can be easily applied to thin or small camera modules such as a smartphone.

Embodiments of the present invention will be described more fully hereinafter with reference to the accompanying drawings.

Embodiment 1

FIG. 2 shows a first embodiment of a wide-angle lens system for high resolution according to the present invention.

As shown, the first lens L1, the second lens L2, the third lens L3, the fourth lens L4, the fifth lens L5, and the sixth lens L6 are arranged in order from the focal object side along the optical axis.

Table 1 shows numerical data of the lenses configuring the optical system according to the first embodiment of the present invention.

TABLE 1

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.588 | 0.31 | 1.5441 | 56.0 |
| STOP | 1.474 | 0.05 | | |
| 3 | 1.36381 | 0.54 | 1.5441 | 56.0 |
| 4 | 48.067 | 0.03 | | |
| 5 | 32.120 | 0.18 | 1.67 | 19.4 |
| 6 | 3.591 | 0.27 | | |
| 7 | −33.390 | 0.45 | 1.615 | 25.6 |
| 8 | −12.028 | 0.49 | | |
| 9 | 5.243 | 0.48 | 1.5441 | 56.0 |
| 10 | −7.038 | 0.26 | | |
| 11 | −67.116 | 0.44 | 1.535 | 56.0 |

TABLE 1-continued

| Surface (Surface Number) | RDY (Radius of Curvature) | THI (Thickness) | Nd (Refractive Index) | Vd (Abbe Number) |
|---|---|---|---|---|
| 12 | 1.515 | 0.12 | | |
| 13 | INFINITY | 0.11 | 1.517 | 64.2 |
| 14 | INFINITY | 0.62 | | |
| IMAGE | INFINITY | 0.00 | | |

As shown in FIG. 2, the first lens L1, the second lens L2, the third lens L3, the fourth lens L4, the fifth lens L5, and the sixth lens L6 are arranged from the focal object side. When the optical axis direction is set to X-axis and the direction orthogonal to the optical axis is set to the Y-axis, then the aspherical expression is as follows.

$$X(Y) = \frac{Y^2}{R} \frac{1}{1 + \sqrt{1-(1+K)\left(\frac{Y}{R}\right)^2}} + A_3Y^4 + A_4Y^6 + A_5Y^8 + A_6Y^{10} + \ldots + A_{14}Y^{26}$$ [Equation 1]

An aspheric surface is a curved surface produced by rotating a curve obtained by the aspherical expression of Equation 1 around the optical axis, R is a radius of curvature, K is a conic constant, and A3, A4, A5, A6, ..., A14 are aspherical coefficients.

Aspheric coefficients having data for the above lenses from Equation 1 are shown in Table 2 below.

The maximum distance interval T12 between the first lens L1 and the second lens L2 is 0.18 mm, the maximum distance interval T23 between the second lens L2, and the third lens L3 is 0.06 mm. An absolute ratio of the composite focal length f123 of the first lens, the second lens L2 and the third lens L3 with regard to the composite focal length f56 of the fifth lens L5, and the sixth lens L6|f123/f56| is 0.58. The distance TTL (TTL/ImagH) from the front of the lens system to the image surface with respect to the image height ImagH is 1.35, and the refractive power P4 of the fourth lens L4 is 0.03 and the angle of view of the entire lens system is 79.6 degrees.

FIG. 3 shows an aberration diagram according to the first embodiment of the present invention.

The first data of FIG. 3 shows spherical aberration, where the horizontal axis represents the focal point (mm), the vertical axis represents the image height (mm), and each graph represents the wavelength of incident light. As shown, the closer the graphs are to the central vertical axis and the closer they are to each other, the better the correction of spherical aberration. The spherical aberration of the first embodiment according to the present invention is 0.025 mm or less (focus) and is considered to be good.

The second data of FIG. 3 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astig-

TABLE 2

| | K | A3 | A4 | A5 | A6 |
|---|---|---|---|---|---|
| s1 | −1.68354 | −9.135210E−03 | −1.977800E−01 | 1.073990E+00 | −3.724600E+00 |
| s2 | 0.00000 | −3.177920E−01 | −4.509810E−02 | 4.873110E−01 | −3.761770E−01 |
| s3 | 0.00000 | −2.154250E−01 | −1.468580E−02 | 3.302650E−01 | −1.464590E−01 |
| s4 | 0.00000 | −2.160360E−01 | 8.986120E−01 | −2.206100E+00 | 3.155870E+00 |
| s5 | 0.00000 | −2.480890E−01 | 1.502310E+00 | −5.415160E+00 | 1.680570E+01 |
| s6 | 14.60859 | −1.198430E−01 | 7.584650E−01 | −2.908320E+00 | 9.673240E+00 |
| s7 | 0.00000 | −2.200980E−01 | 5.645700E−01 | −3.587180E+00 | 1.631240E+01 |
| s8 | 0.00000 | −1.781930E−01 | 1.216440E−01 | −1.946860E−01 | 7.791700E−02 |
| s9 | −98.94196 | 4.404520E−02 | −2.232690E−01 | 3.307630E−01 | −5.169110E−01 |
| s10 | 3.46665 | −1.664980E−02 | 5.691430E−02 | −1.528560E−02 | −9.313970E−02 |
| s11 | 69.15039 | −5.379400E−01 | 6.065740E−01 | −3.980440E−01 | 1.690450E−01 |
| s12 | −11.69187 | −2.048840E−01 | 1.845660E−01 | −1.145710E−01 | 4.725720E−02 |

| | A7 | A8 | A9 | A10 | A11 |
|---|---|---|---|---|---|
| s1 | 7.684350E+00 | −9.924380E+00 | 7.828560E+00 | −3.410470E+00 | 6.203180E−01 |
| s2 | −1.989240E+00 | 6.282960E+00 | −7.698360E+00 | 4.352180E+00 | −9.320990E−01 |
| s3 | −1.062050E+00 | 2.963970E+00 | −3.281370E+00 | 1.608630E+00 | −2.765250E−01 |
| s4 | −4.773380E+00 | 1.064800E+01 | −1.513420E+01 | 1.011790E+01 | −2.499830E+00 |
| s5 | −4.490120E+01 | 8.680110E+01 | −1.038570E+02 | 6.752070E+01 | −1.823670E+01 |
| s6 | −2.496660E+01 | 4.285460E+01 | −4.364530E+01 | 2.305520E+01 | −4.703900E+00 |
| s7 | −4.883520E+01 | 9.437340E+01 | −1.129380E+02 | 7.632140E+01 | −2.230880E+01 |
| s8 | 6.478400E−01 | −1.520680E+00 | 1.582000E+00 | −7.902330E−01 | 1.503870E−01 |
| s9 | 5.119830E−01 | −3.514480E−01 | 1.648520E−01 | −4.403670E−02 | 4.828390E−03 |
| s10 | 9.683550E−02 | −4.163900E−02 | 9.131070E−03 | −9.966710E−04 | 4.188350E−05 |
| s11 | −4.619580E−02 | 7.904220E−03 | −7.963250E−04 | 4.087090E−05 | −7.022660E−07 |
| s12 | −1.274480E−02 | 2.167440E−03 | −2.198180E−04 | 1.194070E−05 | −2.620360E−07 |

The center thickness Tc (Tc/Te) of the first lens L1 with respect to the thickness Te of the outermost effective diameter of the first lens L1 is 1.36, and the refractive power P1 of the first lens L1 is −0.001. The absolute value |R4| of the radius of curvature of the rear surface of the second lens L2 is 48.1, and the absolute value |R5| of the radius of curvature of the front surface of the third lens L3 is 32.1.

matism correction. The spherical aberration of the first embodiment according to the present invention is 0.025 mm or less (focus) and is considered to be good.

The third data of FIG. 3 shows distortion aberration, where the horizontal axis represents the distortion degree (%) and the vertical axis represents the height of an image (mm). Generally, it is known to be good if the aberration curve is in the range of −2~2%. Optical distortion, which is the distortion aberration of the first embodiment according to the present invention, is judged to be good at 2% or less.

Embodiment 2

FIG. 4 shows a second embodiment of a wide-angle lens system for high resolution according to the present invention.

As shown, the first lens L1, the second lens L2, the third lens L3, the fourth lens L4, the fifth lens L5, and the sixth lens L6 are arranged in sequence from the focal object side along the optical axis.

Table 3 shows numerical data of the lenses configuring the optical system according to the second embodiment of the present invention.

As shown in FIG. 4, the first lens L1, the second lens L2, the third lens L3, the fourth lens L4, the fifth lens L5, and the sixth lens L6 are arranged from the focal object side. When the optical axis direction is set to X-axis and the direction orthogonal to the optical axis is set to the Y-axis, then the aspherical expression is as the equation 1 above.

An aspheric surface is a curved surface produced by rotating the curve obtained by the aspherical expression of Equation 1 around the optical axis, R is a radius of curvature, K is a conical constant, and A3, A4, A5, A6, . . . , A14 are aspherical coefficients.

Aspheric coefficients having data for the above lenses from Equation 1 are shown in Table 4 below.

TABLE 4

|  | K | A3 | A4 | A5 | A6 |
| --- | --- | --- | --- | --- | --- |
| s1 | −2.15805 | −1.517490E−02 | −1.943610E−01 | 1.073600E+00 | −3.717800E+00 |
| s2 | 0.00000 | −3.535200E−01 | −5.633560E−02 | 4.875390E−01 | −3.881040E−01 |
| s3 | 0.00000 | −2.257270E−01 | −2.805440E−02 | 3.000700E−00 | −1.485160E−01 |
| s4 | 0.00000 | −2.064710E−01 | 9.096410E−01 | −2.204510E+00 | 3.147930E+00 |
| s5 | 0.00000 | −2.704840E−01 | 1.578930E+00 | −5.477560E+00 | 1.640920E+01 |
| s6 | 13.44960 | −1.516610E−01 | 8.700420E−01 | −3.218260E+00 | 1.046680E+01 |
| s7 | 0.00000 | −2.349600E−01 | 5.870480E−01 | −3.614220E+00 | 1.634890E+01 |
| s8 | 0.00000 | −1.855470E−01 | 1.110900E−01 | −9.466490E−02 | −3.062890E−01 |
| s9 | −98.94196 | 6.452980E−02 | −2.562080E−01 | 3.636790E−01 | −5.284720E−01 |
| s10 | 3.46665 | −1.517970E−02 | 7.275200E−02 | −6.057080E−02 | −3.741540E−02 |
| s11 | 69.15039 | −5.379400E−01 | 6.065740E−01 | −3.980440E−01 | 1.690450E−01 |
| s12 | −11.69187 | −2.048840E−01 | 1.845660E−01 | −1.145710E−01 | 4.725720E−02 |

|  | A7 | A8 | A9 | A10 | A11 |
| --- | --- | --- | --- | --- | --- |
| s1 | 7.679940E+00 | −9.924380E+00 | 7.828560E+00 | −3.410470E+00 | 6.203180E−01 |
| s2 | −1.983330E+00 | 6.282960E+00 | −7.698360E+00 | 4.352180E+00 | −9.320990E−01 |
| s3 | −1.049610E+00 | 2.963970E+00 | −3.281370E+00 | 1.608630E+00 | −2.765250E−01 |
| s4 | −4.773380E+00 | 1.064800E+00 | −1.513420E+00 | 1.011790E+01 | −2.499830E+00 |
| s5 | −4.197080E+01 | 7.817350E+01 | −9.086100E+01 | 5.752490E+01 | −1.512310E+01 |
| s6 | −2.563560E+01 | 4.112250E+01 | −3.879320E+01 | 1.860390E+01 | −3.264260E+00 |
| s7 | −4.883520E+01 | 9.437340E+01 | −1.129380E+02 | 7.632140E+01 | −2.230880E+01 |
| s8 | 1.537500E+00 | −2.773120E+00 | 2.628160E+00 | −1.256910E+00 | 2.341920E−01 |
| s9 | 4.900230E−01 | −3.100420E−01 | 1.312150E−01 | −3.077160E−02 | 2.809240E−03 |
| s10 | 5.760280E−02 | −2.519230E−02 | 5.083410E−03 | −4.553920E−04 | 1.138080E−05 |
| s11 | −4.619580E−02 | 7.904220E−03 | −7.963250E−04 | 4.087090E−05 | −7.022660E−07 |
| s12 | −1.274480E−02 | 2.167440E−03 | −2.198180E−04 | 1.194070E−05 | −2.620360E−07 |

TABLE 3

| Surface (Surface Number) | RDY (Radius of Curvature) | THI (Thickness) | Nd (Refractive Index) | Vd (Abbe Number) |
| --- | --- | --- | --- | --- |
| FOCAL OBJECT | INFINITY | INFINITY |  |  |
| 1 | 1.609 | 0.28 | 1.5441 | 56.0 |
| STOP | 1.308 | 0.05 |  |  |
| 3 | 1.22801 | 0.58 | 1.5441 | 56.0 |
| 4 | −335.675 | 0.03 |  |  |
| 5 | 49.121 | 0.18 | 1.67 | 19.4 |
| 6 | 3.529 | 0.27 |  |  |
| 7 | −53.452 | 0.44 | 1.615 | 25.6 |
| 8 | −11.885 | 0.51 |  |  |
| 9 | 4.885 | 0.47 | 1.5441 | 56.0 |
| 10 | −7.727 | 0.26 |  |  |
| 11 | −61.599 | 0.44 | 1.535 | 56.0 |
| 12 | 1.513 | 0.12 |  |  |
| 13 | INFINITY | 0.11 | 1.517 | 64.2 |
| 14 | INFINITY | 0.62 |  |  |
| IMAGE | INFINITY | 0.00 |  |  |

The center thickness Tc (Tc/Te) of the first lens L1 with respect to the thickness Te of the outermost effective diameter of the first lens L1 is 1.21, and the refractive power P1 of the first lens L1 is −0.05. The absolute value |R4| of the radius of curvature of the rear surface of the second lens L2 is 335.7, and the absolute value |R5| of the radius of curvature of the front surface of the third lens L3 is 49.1.

The maximum distance interval T12 between the first lens L1 and the second lens L2 is 0.19 mm, the maximum distance interval T23 between the second lens L2, and the third lens L3 is 0.05 mm.

An absolute ratio of the composite focal length f123 of the first lens, the second lens L2 and the third lens L3 with regard to the composite focal length f56 of the fifth lens L5, and the sixth lens satisfies L6|f123/f56|=0.59. The distance TTL from the front of the lens system to the image surface with respect to the image height ImagH satisfies TTL/ImagH=1.35. The refractive power P4 of the fourth lens L4 is 0.04 and the angle of view of the entire lens system is 79.9 degrees.

FIG. 5 shows an aberration diagram according to the second embodiment of the present invention.

The first data of FIG. 5 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the second embodiment according to the present invention is 0.025 mm or less (focus) and is considered to be good.

The second data of FIG. 5 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the second embodiment according to the present invention is 0.025 mm or less (focus) and is considered to be good.

The third data of FIG. 5 shows distortion aberration, where the horizontal axis represents the distortion degree (%) and the vertical axis represents the height of an image (mm). Generally, it is known to be good if the aberration curve is in the range of −2~2%. Optical distortion, which is the distortion aberration of the second embodiment according to the present invention, is judged to be good at 2% or less.

Embodiment 3

FIG. 6 shows a third embodiment of a wide-angle lens system for high resolution according to the present invention.

As shown, the first lens L1, the second lens L2, the third lens L3, the fourth lens L4, the fifth lens L5, and the sixth lens L6 are arranged in sequence from the focal object side along the optical axis.

TABLE 5

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.587 | 0.30 | 1.5441 | 56.0 |
| STOP | 1.399 | 0.05 | | |
| 3 | 1.30853 | 0.56 | 1.5441 | 56.0 |
| 4 | 65.037 | 0.03 | | |
| 5 | 37.064 | 0.18 | 1.67 | 19.4 |
| 6 | 3.608 | 0.27 | | |
| 7 | −45.389 | 0.45 | 1.615 | 25.6 |
| 8 | −13.004 | 0.50 | | |
| 9 | 5.180 | 0.47 | 1.5441 | 56.0 |
| 10 | −6.944 | 0.26 | | |
| 11 | −61.752 | 0.44 | 1.535 | 56.0 |
| 12 | 1.513 | 0.12 | | |
| 13 | INFINITY | 0.11 | 1.517 | 64.2 |
| 14 | INFINITY | 0.62 | | |
| IMAGE | INFINITY | 0.00 | | |

As shown in FIG. 6, the first lens L1, the second lens L2, the third lens L3, the fourth lens L4, the fifth lens L5, and the sixth lens L6 are arranged from the focal object side. When the optical axis direction is set to X-axis and the direction orthogonal to the optical axis is set to the Y-axis, then the aspherical expression is as follows.

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 6 below.

TABLE 6

| | K | A3 | A4 | A5 | A6 |
|---|---|---|---|---|---|
| s1 | −1.79652 | −1.079810E−02 | −1.963350E−01 | 1.076000E+00 | −3.723140E+00 |
| s2 | 0.00000 | −3.265750E−01 | −4.897910E−02 | 4.858730E−01 | −3.778510E−01 |
| s3 | 0.00000 | −2.172460E−01 | −2.137000E−02 | 3.222740E−01 | −1.490900E−01 |
| s4 | 0.00000 | −2.148790E−01 | 9.012130E−01 | −2.204520E+00 | 3.154630E+00 |
| s5 | 0.00000 | −2.514390E−01 | 1.517160E+00 | −5.360020E+00 | 1.619440E+01 |
| s6 | 14.56596 | −1.243780E−01 | 7.783870E−01 | −2.921310E+00 | 9.618740E+00 |
| s7 | 0.00000 | −2.229570E−01 | 5.701840E−01 | −3.586750E+00 | 1.631540E+01 |
| s8 | 0.00000 | −1.789800E−01 | 1.175670E−01 | −1.682380E−01 | −1.850720E−03 |
| s9 | −98.94196 | 4.912320E−02 | −2.303130E−01 | 3.465910E−01 | −5.554560E−01 |
| s10 | 3.46665 | −1.457400E−02 | 6.236310E−02 | 2.952750E−02 | −7.744890E−02 |
| s11 | 69.15039 | −5.379400E−01 | 6.065740E−01 | −3.980440E−01 | 1.690450E−01 |
| s12 | −11.69187 | −2.048840E−01 | 1.845660E−01 | −1.145710E−01 | 4.725720E−02 |

| | A7 | A8 | A9 | A10 | A11 |
|---|---|---|---|---|---|
| s1 | 7.681900E+00 | −9.924380E+00 | 7.828560E+00 | −3.410470E+00 | 6.203180E−01 |
| s2 | −1.989630E+00 | −6.282960E+00 | −7.698360E+00 | 4.352180E+00 | −9.320990E−01 |
| s3 | −1.056500E+00 | 2.963970E+00 | −3.281370E+00 | 1.608630E+00 | −2.765250E−01 |
| s4 | −4.773380E+00 | 1.064800E+01 | −1.513420E+01 | 1.011790E+01 | −2.499830E+00 |
| s5 | −4.215330E+01 | 7.991930E+01 | −9.409410E+01 | 6.015420E+01 | −1.593860E+01 |
| s6 | −2.453410E+01 | 4.144870E+01 | −4.138710E+01 | 2.128500E+01 | −4.164750E+00 |
| s7 | −4.883520E+01 | 9.437340E+01 | −1.129380E+02 | 7.632140E+01 | 2.230880E+01 |
| s8 | 8.038140E−01 | −1.713500E+00 | 1.726590E+00 | −8.488510E−01 | 1.600730E−01 |
| s9 | 5.712090E−01 | −4.078810E−01 | 1.954210E−01 | −5.249400E−02 | 5.755050E−03 |
| s10 | 8.490480E−02 | −3.554400E−02 | 7.248080E−03 | −6.842910E−04 | 2.058830E−05 |
| s11 | −4.619580E−02 | 7.904220E−03 | −7.963250E−04 | 4.087090E−05 | −7.022660E−07 |
| s12 | −1.274480E−02 | 2.167440E−03 | −2.198180E−04 | 1.194070E−05 | −2.620360E−07 |

Table 5 shows numerical data of the lenses configuring the optical system according to the third embodiment of the present invention.

The center thickness Tc (Tc/Te) of the first lens L1 with respect to the thickness Te of the outermost effective diameter of the first lens L1 is 1.30, and the refractive power P1 of the first lens L1 is −0.02. The absolute value |R4| of the radius of curvature of the rear surface of the second lens L2 is 65.0, and the absolute value |R5| of the radius of curvature of the front surface of the third lens L3 is 37.1.

The maximum distance interval T12 between the first lens L1 and the second lens L2 is 0.18 mm, the maximum distance interval T23 between the second lens L2, and the third lens L3 is 0.06 mm. An absolute ratio of the composite focal length f123 of the first lens, the second lens L2 and the third lens L3 with regard to the composite focal length f56 of the fifth lens L5, and the sixth lens L6 satisfy|f123/f56|=0.57, The distance TTL from the front of the lens system to the image surface with respect to the image height ImagH satisfy (TTL/ImagH)=1.34. The refractive power P4 of the fourth lens L4 is 0.03, and the angle of view of the entire lens system is 79.7 degrees.

FIG. 7 shows an aberration diagram according to the third embodiment of the present invention.

The first data of FIG. 7 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the third embodiment according to the present invention is 0.025 mm or less (focus) and is considered to be good.

The second data of FIG. 7 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the third embodiment according to the present invention is 0.025 mm or less (focus) and is considered to be good.

The third data of FIG. 7 shows distortion aberration, where the horizontal axis represents the distortion degree (%) and the vertical axis represents the height of an image (mm). Generally, it is known to be good if the aberration curve is in the range of −2~2%. Optical distortion, which is the distortion aberration of the third embodiment according to the present invention, is judged to be good at 2% or less.

Embodiment 4

FIG. 8 shows a fourth embodiment of a wide-angle lens system for high resolution according to the present invention.

As shown, the first lens L1, the second lens L2, the third lens L3, the fourth lens L4, and the fifth lens L5 are arranged in sequence from the focal object side along the optical axis.

Table 7 shows numerical data of the lenses configuring the optical system according to the fourth embodiment of the present invention.

TABLE 7

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.599 | 0.33 | 1.5441 | 56.0 |
| STOP | 1.476 | 0.05 | | |
| 3 | 1.40265 | 0.58 | 1.5441 | 56.0 |
| 4 | 49.061 | 0.03 | | |
| 5 | 37.579 | 0.18 | 1.67 | 19.4 |
| 6 | 3.812 | 0.30 | | |
| 7 | −26.062 | 0.37 | 1.615 | 25.6 |
| 8 | −8.724 | 0.54 | | |
| 9 | 4.893 | 0.42 | 1.5441 | 56.0 |
| 10 | −10.759 | 0.27 | | |
| 11 | −46.006 | 0.46 | 1.535 | 56.0 |
| 12 | 1.559 | 0.12 | | |
| 13 | INFINITY | 0.11 | 1.517 | 64.2 |
| 14 | INFINITY | 0.60 | | |
| IMAGE | INFINITY | 0.00 | | |

As shown in FIG. 8, the first lens L1, the second lens L2, the third lens L3, the fourth lens L4, the fifth lens L5, and the sixth lens L6 are arranged from the focal object side. When the optical axis direction is set to X-axis and the direction orthogonal to the optical axis is set to the Y-axis, then the aspherical expression is as the equation 1 above.

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 8 below.

TABLE 8

| | K | A3 | A4 | A5 | A6 |
|---|---|---|---|---|---|
| s1 | −1.60634 | −9.703060E−03 | −2.050810E−01 | 1.103190E+00 | −3.745940E+00 |
| s2 | 0.00000 | −3.065240E−01 | −7.324760E−02 | 5.489740E−01 | −4.414440E−01 |
| s3 | 0.00000 | −1.967580E−01 | −5.095550E−02 | 3.828470E−01 | −1.416130E−01 |
| s4 | 0.00000 | −2.056700E−01 | 8.577120E−01 | −2.098870E+00 | 3.005610E+00 |
| s5 | 0.00000 | −2.641540E−01 | 1.568520E+00 | −6.498830E+00 | 2.336670E+01 |
| s6 | 16.17202 | −1.365090E−01 | 8.402780E−01 | −4.011120E+00 | 1.579070E+01 |
| s7 | 0.00000 | −2.361520E−01 | 5.373300E−01 | −3.576900E+00 | 1.625520E+01 |
| s8 | 0.00000 | −1.917810E−01 | 9.480820E−02 | −9.167490E−02 | −2.381810E−01 |
| s9 | −98.94196 | 4.545370E−02 | −1.715430E−01 | −1.481930E−01 | −1.890750E−01 |
| s10 | 3.46665 | −4.799370E−02 | 1.310970E−01 | −1.654850E−01 | 8.454760E−02 |
| s11 | 69.15039 | −5.379400E−01 | 6.065740E−01 | −3.980440E−01 | 1.690450E−01 |
| s12 | −11.69187 | −2.048840E−01 | 1.845660E−01 | −1.145710E−01 | 4.725720E−02 |

TABLE 8-continued

| | A7 | A8 | A9 | A10 | A11 |
|---|---|---|---|---|---|
| s1 | 7.676540E+00 | −9.904660E+00 | −7.833990E+00 | −3.434090E+00 | 6.317680E−01 |
| s2 | −2.005810E+00 | 6.401790E+00 | −7.824690E+00 | 4.418740E+00 | −9.460900E−01 |
| s3 | −1.153430E+00 | 2.949300E+00 | −3.140120E+00 | 1.529330E+00 | −2.765250E−01 |
| s4 | −4.798060E+00 | 1.079800E+01 | −1.521220E+01 | 1.011790E+01 | −2.499830E+00 |
| s5 | −6.713110E+01 | 1.325040E+02 | −1.606120E+02 | 1.067460E+02 | −2.980100E+01 |
| s6 | −4.429520E+01 | 7.987810E+01 | −8.635820E+01 | 5.033870E+01 | −1.205220E+01 |
| s7 | −4.883520E+01 | 9.437340E+01 | −1.129380E+02 | 7.632140E+01 | −2.230880E+01 |
| s8 | 1.166080E+00 | −2.012290E+00 | 1.820500E+00 | −8.204470E−01 | 1.432030E−01 |
| s9 | 1.574980E−01 | −1.153510E−01 | 6.713190E−02 | −2.069370E−02 | 2.402230E−03 |
| s10 | −3.753740E−02 | 2.197170E−02 | −8.772570E−03 | 1.723220E−03 | −1.291790E−04 |
| s11 | −4.619580E−02 | 7.904220E−03 | −7.963250E−04 | 4.087090E−05 | −7.022660E−07 |
| s12 | −1.274480E−02 | 2.167440E−03 | −2.198180E−04 | 1.194070E−05 | −2.620360E−07 |

The center thickness Tc (Tc/Te) of the first lens L1 with respect to the thickness Te of the outermost effective diameter of the first lens L1 is 1.32, and the refractive power P1 of the first lens L1 is −0.001. The absolute value |R4| of the radius of curvature of the rear surface of the second lens L2 is 49.1, and the absolute value |R5| of the radius of curvature of the front surface of the third lens L3 is 37.6.

The maximum distance interval T12 between the first lens L1 and the second lens L2 is 0.16 mm, the maximum distance interval T23 between the second lens L2, and the third lens L3 is 0.05 mm. An absolute ratio of the composite focal length f123 of the first lens, the second lens L2 and the third lens L3 with regard to the composite focal length f56 of the fifth lens L5, and the sixth lens L6 satisfies|f123/f56|=0.66. The distance TTL from the front of the lens system to the image surface with respect to the image height ImagH satisfies (TTL/ImagH)=1.35. The refractive power P4 of the fourth lens L4 is 0.05, and the angle of view of the entire lens system is 79.2 degrees.

FIG. 9 shows an aberration diagram according to the fourth embodiment of the present invention.

The first data of FIG. 9 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the fourth embodiment according to the present invention is 0.025 mm or less (focus) and is considered to be good.

The second data of FIG. 9 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the fourth embodiment according to the present invention is 0.025 mm or less (focus) and is considered to be good.

The third data of FIG. 9 shows distortion aberration, where the horizontal axis represents the distortion degree (%) and the vertical axis represents the height (mm). Generally, it is known to be good if the aberration curve is in the range of −2~2%. Optical distortion, which is the distortion aberration of the fourth embodiment according to the present invention, is judged to be good at 2% or less.

Embodiment 5

FIG. 10 shows a fifth embodiment of a wide-angle lens system for high resolution according to the present invention.

As shown, the first lens L1, the second lens L2, the third lens L3, the fourth lens L4, and the fifth lens L5 are arranged in sequence from the focal object side along the optical axis.

Table 9 shows numerical data of the lenses configuring the optical system according to the fifth embodiment of the present invention.

TABLE 9

| Surface (Surface Number) | RDY (Radius of Curvature) | THI (Thickness) | Nd (Refractive Index) | Vd (Abbe Number) |
|---|---|---|---|---|
| FOCAL OBJECT | INFINITY | INFINITY | | |
| 1 | 1.700 | 0.31 | 1.5441 | 56.0 |
| STOP | 1.597 | 0.05 | | |
| 3 | 1.39372 | 0.61 | 1.5441 | 56.0 |
| 4 | 25.603 | 0.03 | | |
| 5 | 37.579 | 0.18 | 1.67 | 19.4 |
| 6 | 3.812 | 0.30 | | |
| 7 | −26.062 | 0.37 | 1.615 | 25.6 |
| 8 | −8.724 | 0.54 | | |
| 9 | 4.893 | 0.42 | 1.5441 | 56.0 |
| 10 | −10.759 | 0.27 | | |
| 11 | −46.006 | 0.46 | 1.535 | 56.0 |
| 12 | 1.559 | 0.12 | | |
| 13 | INFINITY | 0.11 | 1.517 | 64.2 |
| 14 | INFINITY | 0.60 | | |
| IMAGE | INFINITY | 0.00 | | |

As shown in FIG. 10, the first lens L1, the second lens L2, the third lens L3, the fourth lens L4, the fifth lens L5, and the sixth lens L6 are arranged from the focal object side. When the optical axis direction is set to X-axis and the direction orthogonal to the optical axis is set to the Y-axis, then the aspherical expression is as the equation 1 above.

An aspheric surface is a curved surface produced by rotating the curve obtained by the aspherical expression of Equation 1 around the optical axis, R is a radius of curvature, K is a conic constant, and A3, A4, A5, A6, . . . , A14 are aspherical coefficients.

Aspheric coefficients having data for the above lenses from Equation 1 are shown in Table 10 below.

TABLE 10

| | K | A3 | | A4 | A5 | A6 |
|---|---|---|---|---|---|---|
| s1 | −4.03589 | 1.3713 | 30E−02 | −2.374960E−01 | 1.067130E+00 | −3.702660E+00 |
| s2 | 0.00000 | −4.3224 | 30E−01 | 5.339050E−02 | 5.402310E−01 | −4.506240E−01 |
| s3 | 0.00000 | −2.8702 | 70E−01 | 4.764210E−02 | 4.577240E−01 | −2.339880E−01 |
| s4 | 0.00000 | −2.0306 | 30E−01 | 8.933470E−01 | −2.299590E+00 | 3.514440E+00 |
| s5 | 0.00000 | −2.6415 | 40E−01 | 1.568520E+00 | −6.498830E+00 | 2.336670E+01 |
| s6 | 16.17202 | −1.3650 | 90E−01 | 8.402780E−01 | −4.011120E+00 | 1.579070E+01 |
| s7 | 0.0000 | −2.361520E−01 | | 5.373300E−01 | −3.576900E+00 | 1.625520E+01 |
| s8 | 0.00000 | −1.9178 | 10E−01 | 9.480820E−02 | −9.167490E−02 | −2.381810E−01 |
| s9 | −98.94196 | 4.5453 | 70E−02 | −1.715430E−01 | 1.481930E−01 | −1.890750E−01 |
| s10 | 3.46665 | −4.7993 | 70E−02 | 1.310970E−01 | −1.654850E−01 | 8.454760E−02 |
| s11 | 69.15039 | −5.3794 | 00E−01 | 6.065740E−01 | −3.980440E−01 | 1.690450E−01 |
| s12 | −11.69187 | −2.0488 | 40E−01 | 1.845660E−01 | −1.145710E−01 | 4.725720E−02 |

| | A7 | A8 | A9 | A10 | A11 |
|---|---|---|---|---|---|
| s1 | 7.684310E+00 | −9.939710E+00 | 7.873670E+00 | −3.441830E+00 | 6.234940E−01 |
| s2 | −2.101850E+00 | 6.407930E+00 | −7.641880E+00 | 4.285530E+00 | −9.265780E−01 |
| s3 | −1.254250E+00 | 3.044670E+00 | −3.100930E+00 | 1.495820E+00 | −2.765250E−01 |
| s4 | −5.429730E+00 | 1.116140E+01 | −1.528290E+01 | 1.011790E+01 | −2.499830E+00 |
| s5 | −6.713110E+01 | 1.325040E+02 | −1.606120E+02 | 1.067460E+02 | −2.980100E+01 |
| s6 | −4.429520E+01 | 7.987810E+01 | −8.635820E+01 | 5.033870E+01 | −1.205220E+01 |
| s7 | −4.883520E+01 | 9.437340E+01 | −1.129380E+02 | 7.632140E+01 | −2.230880E+01 |
| s8 | 1.166080E+00 | −2.012290E+00 | 1.820500E+00 | −8.204470E−01 | 1.432030E−01 |
| s9 | 1.574980E−01 | −1.153510E+00 | 6.713190E−02 | −2.069370E−02 | 2.402230E−03 |
| s10 | −3.753740E−02 | 2.197170E−02 | −8.772570E−03 | 1.723220E−03 | −1.291790E−04 |
| s11 | −4.619580E−02 | 7.904220E−03 | −7.963250E−04 | 4.087090E−05 | −7.022660E−07 |
| s12 | −1.274480E−02 | 2.167440E−03 | −2.198180E−04 | 1.194070E−05 | −2.620360E−07 |

The center thickness Tc (Tc/Te) of the first lens L1 with respect to the thickness Te of the outermost effective diameter of the first lens L1 is 1.45, and the refractive power P1 of the first lens L1 is 0.001. The absolute value |R4| of the radius of curvature of the rear surface of the second lens L2 is 25.6, and the absolute value |R5| of the radius of curvature of the front surface of the third lens L3 is 37.6.

The maximum distance interval T12 between the first lens L1 and the second lens L2 is 0.22 mm, the maximum distance interval T23 between the second lens L2, and the third lens L3 is 0.04 mm. An absolute ratio of the composite focal length f123 of the first lens, the second lens L2 and the third lens L3 with regard to the composite focal length f56 of the fifth lens L5, and the sixth lens L6 satisfies |f123/f56|=0.66. The distance TTL from the front of the lens system to an image surface with respect to the image height ImagH satisfies (TTL/ImagH)=1.34. The refractive power P4 of the fourth lens L4 is 0.05, and the angle of view of the entire lens system is 79.4 degrees.

FIG. 10 shows an aberration diagram according to the fifth embodiment of the present invention.

The first data of FIG. 10 shows spherical aberration, where the horizontal axis represents the focal point (mm), the vertical axis represents the image height (mm), and each graph represents the wavelength of incident light. As shown, the closer the graphs are to the central vertical axis and the closer to each other, the better the correction of spherical aberration. The spherical aberration of the first embodiment according to the present invention is 0.025 mm or less (focus) and is considered to be good.

The second data of FIG. 10 shows astigmatism, the horizontal axis represents the focal point (mm), the vertical axis represents the image height (mm), and the graph S represents the sagittal, which is a ray incident in the horizontal direction with the lens. Graph T represents the tangential, which is the ray incident in a direction perpendicular to the lens. Here, it is known that the closer the graphs S and T and the closer to the central vertical axis, the better the astigmatism correction. The spherical aberration of the fifth embodiment according to the present invention is 0.025 mm or less (focus) and is considered to be good.

The third data of FIG. 10 shows distortion aberration, where the horizontal axis represents the distortion degree (%) and the vertical axis represents the image height (mm). Generally, it is known to be good if the aberration curve is in the range of −2~2%. Optical distortion, which is distortion aberration of the fifth embodiment according to the present invention, is judged to be good at 2% or less.

What is claimed is:

1. A small wide-angle lens system having a plurality of lenses arranged along an optical axis from a focal object side in order of a first lens, a second lens, a third lens, a fourth lens, a fifth lens, and a sixth lens, the small wide-angle lens system comprising:

the first lens (L1), wherein both surfaces of the first lens (L1) are convex toward the focal object side, a center thickness (Tc) of the first lens (L1) and a thickness (Te) of an outermost effective diameter of the first lens (L1) satisfies 1.1<Tc/Te<1.5, and a refractive power (P1) of the first lens L1 satisfies −0.06<P1<0.06;

the second lens (L2), wherein the second lens (L2) has a positive refractive power, a front surface of the second lens (L2) is convex toward the focal object side, and a radius of curvature (R4) of a rear surface of the second lens (L2) satisfies 10<|R4|;

the third lens (L3), wherein the third lens (L3) has a negative refractive power, a rear surface of the third lens (L3) is concave toward an image side, and a radius of curvature (R5) of a front surface of the third lens (L3) satisfies 10<|R5|;

the fourth lens (L4), wherein both surfaces of the fourth lens (L4) are concave toward the focal object side;

the fifth lens (L5), wherein the fifth lens (L5) has a positive refractive power; and the sixth lens (L6), wherein the sixth lens (L6) has a negative refractive power, wherein a distance interval (T12) within an effective diameter of the first lens (L1) and the second lens (L2)

satisfies T12<0.2 mm, and a distance interval (T23) within an effective diameter of the second lens (L2) and the third lens (L3) satisfies T23<0.1 mm, wherein an image height (ImagH) and a distance (TTL) from a front surface of the lens system to an image surface satisfy TTL/ImagH<1.45.

2. The small wide-angle lens system of claim 1, wherein a composite focal length (f123) of the first lens, the second lens, and the third lens, and a composite focal length (f56) of the fifth lens and the sixth lens satisfy 0.4<|f123/f56|<0.8.

3. The small wide-angle lens system of claim 1, wherein the fourth lens has a positive refractive power, and a refractive power (P4) satisfies 0<P4<0.1.

4. The small wide-angle lens system of claim 1, wherein an Abbe number (V1) of the first lens, an Abbe number (V2) of the second lens, an Abbe number (V3) of the third lens, an Abbe number (V4) of the fourth lens, an Abbe number (V5) of the fifth lens, and an Abbe number (V6) of the sixth lens respectively satisfy 50<V1<60, 50<V2<60, 15<V3<30, 15<V4<30, 50<V5<60, and 50<V6<60.

5. The small wide-angle lens system of claim 1, wherein all of the first to sixth lenses are formed of a plastic material and all surfaces are aspherical.

6. The small wide-angle lens system of claim 1, wherein both surfaces of the fifth lens and the sixth lens are convex toward the image side at peripheral portions.

7. A small wide-angle lens system having a plurality of lenses arranged along an optical axis from a focal object side in order of a first lens, a second lens, a third lens, a fourth lens, a fifth lens, and a sixth lens, the small wide-angle lens system comprising:

the first lens (L1), wherein both surfaces of the first lens (L1) are convex toward the focal object side, a center thickness (Tc) of the first lens (L1) and a thickness (Te) of an outermost effective diameter of the first lens (L1) satisfies 1.1<Tc/Te<1.5, and a refractive power (P1) of the first lens L1 satisfies −0.06<P1<0.06;

the second lens (L2), wherein the second lens (L2) has a positive refractive power, a front surface of the second lens (L2) is convex toward the focal object side, and a radius of curvature (R4) of a rear surface of the second lens (L2) satisfies 10<|R4|;

the third lens (L3), wherein the third lens (L3) has a negative refractive power, a rear surface of the third lens (L3) is concave toward an image side, and a radius of curvature (R5) of a front surface of the third lens (L3) satisfies 10<|R5|;

the fourth lens (L4), wherein both surfaces of the fourth lens (L4) are concave toward the focal object side;

the fifth lens (L5), wherein the fifth lens (L5) has a positive refractive power; and the sixth lens (L6), wherein the sixth lens (L6) has a negative refractive power, wherein a distance interval (T12) within an effective diameter of the first lens (L1) and the second lens (L2) satisfies T12<0.2 mm, and a distance interval (T23) within an effective diameter of the second lens (L2) and the third lens (L3) satisfies T23<0.1 mm, wherein an angle of view of the small wide-angle lens system is greater than 78 degrees.

8. A small wide-angle lens system mounted on a smartphone, having a plurality of lenses arranged along an optical axis in order from a focal object side to a first lens, a second lens, a third lens, a fourth lens, a fifth lens, and a sixth lens, the small wide-angle lens system comprising:

the first lens (L1), wherein both surfaces of the first lens are convex toward the focal object side, a center thickness (Tc) of the first lens and a thickness (Te) of an outermost effective diameter of the first lens satisfy 1.1<Tc/Te<1.5, and a refractive power (P1) of the first lens satisfies −0.06<P1<0.06;

the second lens (L2), wherein the second lens (L2) has a positive refractive power, a front surface of the second lens is convex toward the focal object side, and a radius of curvature (R4) of a rear surface satisfies 10<|R4|;

the third lens (L3), wherein the third lens (L3) has a negative refractive power, a rear surface of the third lens is concave toward an image side, and a radius of curvature (R5) of the front surface satisfies 10<|R5|;

the fourth lens (L4), wherein both surfaces of the fourth lens are concave toward the focal object side and the fourth lens (L4) has a positive refractive power, and a refractive power (P4) satisfies 0<P4<0.1;

the fifth lens (L5), wherein the fifth lens (L5) has a positive refractive power; and the sixth lens (L6), wherein the sixth lens (L6) has a negative refractive power, wherein a composite focal length (f123) of the first lens, the second lens, and the third lens, and a composite focal length (f56) of the fifth lens and the sixth lens satisfy 0.4<|f123/f56|<0.8, wherein an image height (ImagH) and a distance (TTL) from a front surface to an image surface of the lens system satisfy TTL/ImagH<1.45.

9. The small wide-angle lens system of claim 8, wherein a distance interval (T12) between lenses within an effective diameter of the first lens and the second lens satisfies T12<0.2 mm, and a distance interval (T23) between lenses within an effective diameter of the second lens and the third lens satisfies T23<0.1 mm.

10. The small wide-angle lens system of claim 8, wherein an Abbe number (V1) of the first lens, an Abbe number (V2) of the second lens, an Abbe number (V3) of the third lens, an Abbe number (V4) of the fourth lens, an Abbe number (V5) of the fifth lens, and an Abbe number (V6) of the sixth lens respectively satisfy 50<V1<60, 50<V2<60, 15<V3<30, 15<V4<30, 50<V5<60, and 50<V6<60.

11. The small wide-angle lens system of claim 8, wherein all of the first to sixth lenses are formed of a plastic material and all surfaces are aspherical.

12. The small wide-angle lens system of claim 8, wherein both surfaces of the fifth lens and the sixth lens are convex toward the image side at peripheral portions.

13. A small wide-angle lens system mounted on a smartphone, having a plurality of lenses arranged along an optical axis in order from a focal object side to a first lens, a second lens, a third lens, a fourth lens, a fifth lens, and a sixth lens, the small wide-angle lens system comprising:

the first lens (L1), wherein both surfaces of the first lens are convex toward the focal object side, a center thickness (Tc) of the first lens and a thickness (Te) of an outermost effective diameter of the first lens satisfy 1.1<Tc/Te<1.5, and a refractive power (P1) of the first lens satisfies −0.06<P1<0.06;

the second lens (L2), wherein the second lens (L2) has a positive refractive power, a front surface of the second lens is convex toward the focal object side, and a radius of curvature (R4) of a rear surface satisfies 10<|R4|;

the third lens (L3), wherein the third lens (L3) has a negative refractive power, a rear surface of the third lens is concave toward an image side, and a radius of curvature (R5) of the front surface satisfies 10<|R5|;

the fourth lens (L4), wherein both surfaces of the fourth lens are concave toward the focal object side and the fourth lens (L4) has a positive refractive power, and a refractive power (P4) satisfies 0<P4<0.1;

the fifth lens (L5), wherein the fifth lens (L5) has a positive refractive power; and the sixth lens (L6), wherein the sixth lens (L6) has a negative refractive power, wherein a composite focal length (f123) of the first lens, the second lens, and the third lens, and a composite focal length (f56) of the fifth lens and the sixth lens satisfy 0.4<|f123/f56|<0.8, wherein an angle of view of the small wide-angle lens system is greater than 78 degrees.

14. The small wide-angle lens system of claim 7, wherein a composite focal length (f123) of the first lens, the second lens, and the third lens, and a composite focal length (f56) of the fifth lens and the sixth lens satisfy 0.4<|f123/f56|<0.8.

15. The small wide-angle lens system of claim 7, wherein the fourth lens has a positive refractive power, and a refractive power (P4) satisfies 0<P4<0.1.

16. The small wide-angle lens system of claim 7, wherein an Abbe number (V1) of the first lens, an Abbe number (V2) of the second lens, an Abbe number (V3) of the third lens, an Abbe number (V4) of the fourth lens, an Abbe number (V5) of the fifth lens, and an Abbe number (V6) of the sixth lens respectively satisfy 50<V1<60, 50<V2<60, 15<V3<30, 15<V4<30, 50<V5<60, and 50<V6<60.

17. The small wide-angle lens system of claim 13, wherein a distance interval (T12) between lenses within an effective diameter of the first lens and the second lens satisfies T12<0.2 mm, and a distance interval (T23) between lenses within an effective diameter of the second lens and the third lens satisfies T23<0.1 mm.

18. The small wide-angle lens system of claim 13, wherein an Abbe number (V1) of the first lens, an Abbe number (V2) of the second lens, an Abbe number (V3) of the third lens, an Abbe number (V4) of the fourth lens, an Abbe number (V5) of the fifth lens, and an Abbe number (V6) of the sixth lens respectively satisfy 50<V1<60, 50<V2<60, 15<V3<30, 15<V4<30, 50<V5<60, and 50<V6<60.

* * * * *